US007068788B2

(12) United States Patent
Haque et al.

(10) Patent No.: US 7,068,788 B2
(45) Date of Patent: Jun. 27, 2006

(54) DATA ENCRYPTION FOR SUPPRESSION OF DATA-RELATED IN-BAND HARMONICS IN DIGITAL TO ANALOG CONVERTERS

(75) Inventors: Yusuf A. Haque, Woodside, CA (US); Benjamin J. McCarroll, Portland, OR (US); Kevin K. Johnstone, Mountain View, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 912 days.

(21) Appl. No.: 09/949,560

(22) Filed: Sep. 10, 2001

(65) Prior Publication Data

US 2002/0126839 A1 Sep. 12, 2002

Related U.S. Application Data

(60) Provisional application No. 60/259,665, filed on Jan. 4, 2001.

(51) Int. Cl.
*H03M 1/66* (2006.01)
*H04L 9/06* (2006.01)
*H04L 9/10* (2006.01)

(52) U.S. Cl. ....................... 380/265; 341/144; 380/268

(58) Field of Classification Search ................ 341/110, 341/144–154; 380/44, 265, 267, 268

See application file for complete search history.

(56) References Cited

U.S. PATENT DOCUMENTS

| | | | | |
|---|---|---|---|---|
| 3,700,977 | A | 10/1972 | Lunn | 257/533 |
| 3,742,199 | A * | 6/1973 | Lubarsky | 341/95 |
| 3,995,255 | A | 11/1976 | Cuttill | 235/451 |
| 4,453,091 | A | 6/1984 | Katakura et al. | 327/97 |
| 4,580,128 | A | 4/1986 | Ogita et al. | 341/144 |
| 4,608,456 | A | 8/1986 | Paik et al. | 380/28 |
| 4,611,177 | A | 9/1986 | Dildine | 329/358 |
| 4,817,201 | A | 3/1989 | Bonato | 455/325 |
| 4,851,845 | A | 7/1989 | Hotta et al. | 341/159 |
| 5,268,688 | A | 12/1993 | Meyers et al. | 341/143 |
| 5,272,675 | A * | 12/1993 | Kobayashi | 365/221 |
| 5,404,142 | A * | 4/1995 | Adams et al. | 341/144 |
| 5,530,390 | A * | 6/1996 | Russell | 327/164 |
| 5,534,863 | A | 7/1996 | Everitt et al. | 341/150 |
| 5,574,405 | A | 11/1996 | Razavi | 331/2 |

(Continued)

OTHER PUBLICATIONS

"Integrated Circuits And Timing"www.cs.byu.edu/courses/cs143/reading/timing.html.

(Continued)

*Primary Examiner*—Kim Vu
*Assistant Examiner*—Matthew Heneghan
(74) *Attorney, Agent, or Firm*—Perkins Coie LLP

(57) ABSTRACT

The present invention is related to digital to analog converter (DAC) input data encryption off-chip and decryption on-chip to suppress input data in-band harmonic leakage through package related parasitic capacitance. More specifically, the present invention relates to the method and apparatus of input data encryption off-chip by forming the logical exclusive-OR of the raw data and a random single bit data stream. The encrypted data is then read onto the DAC chip where the data is decrypted using identical circuitry and an identical random single bit data stream. The off-chip encryption isolates harmonic content within the input data, preventing leakage of input data harmonic content through IC package-related parasitic capacitance into DAC outputs. Any leakage appears as an increase in spectral noise rather than output distortion and as such, has a much smaller impact on DAC narrow band linearity.

27 Claims, 1 Drawing Sheet

U.S. PATENT DOCUMENTS 5,617,476 A * 4/1997 Ibaraki et al. .............. 380/267
5,684,482 A * 11/1997 Galton ........................ 341/144
5,689,259 A 11/1997 Ozguc ......................... 341/144
5,689,569 A * 11/1997 Peyret ......................... 380/227
5,793,318 A 8/1998 Jewett ......................... 341/118
6,068,660 A 5/2000 Lu ................................ 703/2
6,107,641 A 8/2000 Mei et al. ..................... 257/66
6,344,813 B1 * 2/2002 Pingel et al. ............... 341/144
6,380,878 B1 * 4/2002 Pinna .......................... 341/154
6,456,223 B1 * 9/2002 Yu et al. ..................... 341/161

OTHER PUBLICATIONS

"DAC ICs: How Many Bits Is Enough" Analog Devices Application Note AN-327.
"Design And Layout Rules Eliminate Noise Coupling In Communication Systems" www.ednmag.com/ednmag/reg/1996/062096/13df3.htm.

* cited by examiner

DATA ENCRYPTION FOR SUPPRESSION OF DATA-RELATED IN-BAND HARMONICS IN DIGITAL TO ANALOG CONVERTERS

CROSS REFERENCE TO RELATED APPLICATIONS

This Application claims the benefit of U.S. Provisional Application No. 60/259,665, filed Jan. 4, 2001.

STATEMENT REGARDING FEDERALLY SPONSORED RESEARCH

None.

BACKGROUND OF INVENTION

1. Field of Invention

The present invention is related to digital to analog converter (DAC) input data encryption and decryption in which leakage of input data in-band harmonics is suppressed through input data encryption off-chip. More specifically, the present invention relates to the method and apparatus of input data encryption off-chip by forming the logical exclusive-OR of the raw data and a random single bit data stream. The encrypted data is then transferred onto the DAC chip where decryption occurs through the use of identical circuitry.

2. Description of Related Art

As an increasingly versatile device, digital to analog converters (DAC) are being found in a variety of applications and technologies. For example, many audio systems depend on exacting DAC performance to translate the binary words of tapes or discs into analog signals accurately reflecting the stored data. As the need for converters has increased, improvements to DAC technology have also increased. For instance, audio DAC technology has evolved from 14-bit converters to 16, 18 and even 20-bit converters, fabricated into flat-packs, dual-in-line packs or other convenient packages, made of plastic or ceramic, with isolated and non-isolated pins and a variety of other features.

Through similar measures, improvements to DAC performance have also been demanded, such as improved fan-out and propagation delay. Performance improvements have also included resolving many of the problems associated with smaller and smaller IC packages. For instance, the movement of data within IC packages has typically created several problems, such as crosstalk and transmission line reflections. Another problem associated with data movement within IC packages is leakage surrounding activated digit and word transmission lines. Binary data, consisting of a sufficiently high voltage, will create leakage into surrounding fields unless prevention measures are taken.

As pointed out in U.S. Pat. No. 5,245,569 issued Sep. 14, 1993 to Gonzalez et al., a traditional solution to prevent leakage from data and word lines within IC packages has been the use of long, thick field insulating oxide layers around data and word lines. However, as IC packages have grown smaller and smaller, the use of sufficiently thick field insulating oxide layers becomes impossible. Therefore Gonzalez et al. teaches a method of protecting digit and word lines from one another in IC packages through the use of an isolation voltage applied to surrounding inactive digit and word lines. Digit and word lines not in use, but immediately adjacent to lines in use, are charged with an isolating voltage which prevents leakage from the lines in use to the surrounding fields.

Another problem associated with data movement within IC packages is the detrimental effects certain digital signal frequency components may have on analog signals, primarily within mixed-signal analog-to-digital converters. As pointed out in U.S. Pat. No. 5,793,318 issued Aug. 11, 1998 to Robert E. Jewett, standard solutions such as shielding taught by Gonzalez et al., are often insufficient due to size restrictions or operating frequencies. Therefore Jewett teaches a method of eliminating crosstalk by encoding the output signal of an analog-to-digital converter and removing all correlation between the analog input signal and the encoded digital output signal. Jewett defines crosstalk as undesired noise appearing in one signal path, such as the digital output, resulting from the coupling of one signal path to another, such as the analog input. Encoding the digital output removes all correlation between coupled input and output signals, eliminating crosstalk.

The encoding consists of an exclusive-OR examination of a single bit raw digital output signal of the ADC and a pseudo-random number to encode the single bit digital output signal, preventing any coherence between the encoded digital output signal and the analog input signal. The exclusive-OR encryption eliminates crosstalk by removing all correlation associated with input/output coupling in analog-to-digital conversions. However Jewett and Gonzalez et al. fail to address the same problems in digital-to-analog conversions. Therefore what is needed is a method and apparatus to suppress the package related leakage of the in-band harmonics of n-bit data in digital-to-analog converters.

BRIEF SUMMARY OF THE INVENTION

It is the object of the present invention to create a method and apparatus, which may be used for DAC input data encryption and decryption in which data-related harmonics are suppressed. Encryption occurs off the DAC chip by forming the logical exclusive-OR of the raw data and a random single bit data stream. In this way, the harmonic content of the input data, which may leak to the DAC output through package-related parasitic capacitance, is no longer correlated to the DAC output. Any data leakage then appears at the output as noise, not distortion. In order that the signal is preserved, the data is decrypted on-chip using an identical system of digital circuits as used for encryption.

The present invention consists of an n-bit shift register, n latches and n exclusive-OR gates, where n reflects the size of the n-bit word being converted. In this case, encryption and decryption is of a 14-bit binary word, therefore the system contains a 14-bit shift-right register, fourteen latches and fourteen exclusive-OR gates. The single bit outputs of the fourteen exclusive-OR gates correspond to the 14-bit encrypted word. The output of the first exclusive-OR gate corresponds to bit 0, the output of the second exclusive-OR gate corresponds to bit 1 and so forth. The off-chip 14-bit encryption method and apparatus is shown, whereas the identical on-chip 14-bit decryption method and apparatus is not shown but fully described, the 14-bit decrypted word corresponding to the single bit outputs of fourteen exclusive-OR gates used in the decryption circuitry. In such a manner, the present invention is similarly applicable to 16, 18 and 20-bit converter formats.

Encryption occurs when raw data, consisting of a 14-bit binary word, is registered by fourteen latches on the falling edge of the system clock and then evaluated with a random single-bit data stream loaded into a 14-bit shift register. The random single-bit data stream is fully loaded into the 14-bit shift register after fourteen clock cycles, the data being read on the falling edge of the system clock. Encryption of the raw data and the random data stream occurs through the use of fourteen exclusive-OR logic gates, the single bit outputs corresponding to the 14-bit encrypted word. Both the encrypted data and the random data are then read into the DAC chip for decryption on the rising edge of the system clock. The encryption of the raw data occurs off the DAC chip, therefore input data harmonic content is isolated from the DAC chip, eliminating any chance of package related leakage.

The encrypted data is then decrypted by evaluation with the same random data as was used for encryption through identical circuitry. An example case is shown in the table below.

trates the off-chip circuitry of the present invention for the off-chip encryption of a 14-bit word, however other embodiments may be used to encrypt any n-bit word. In FIG. 1, schematic 1000, there are two rows of fourteen D-type flip flop devices, the lower row coupled as a 14-bit shift right register and the upper row coupled as fourteen shift register latches. Circuit 1000 includes fourteen master devices A106–N106 (the shift right register), fourteen slave devices A104–N104 (the shift register latches) and fourteen exclusive-OR gates A102–N102 (shown as X-OR logic symbols). A single register, latch and X-OR device is used to encrypt one bit of the 14-bit encrypted word. Each single bit output of the fourteen X-OR logic gates corresponds to one bit of the 14-bit encrypted word. Logic gate outputs A100–N100 correspond to bits 0–13 of the encrypted word i.e. output of

| bit | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Raw Data (RD) | 1 | 0 | 1 | 1 | 0 | 1 | 1 | 0 | 0 | 1 | 1 | 1 | 1 | 1 |
| Encrypted Data (ED) = XOR (RD, PRD) | 1 | 1 | 1 | 0 | 0 | 0 | 0 | 1 | 0 | 1 | 1 | 0 | 0 | 0 |
| Decrypted Data (DD) = XOR (ED, PRD) | 1 | 0 | 1 | 1 | 0 | 1 | 1 | 0 | 0 | 1 | 1 | 1 | 1 | 1 |
| Pseudo Random Data (PRD) | 0 | 1 | 0 | 1 | 0 | 1 | 1 | 1 | 0 | 0 | 0 | 1 | 1 | 1 |

The random single-bit data stream present in the 14-bit shift register is input through a dedicated pad which loads a single bit into the first register, the value being shifted right upon each system clock cycle. Therefore, a 14-bit shift register will require fourteen system clock cycles to load the random bit register. To provide for no decryption, the random single bit data stream is set to zero, either through the pad or through reset functions of the registers.

Encryption occurs off the DAC chip such that the harmonic content of the input data, which may leak to the DAC output through package-related parasitic capacitance, is no longer correlated to the DAC output. Any harmonic content then appears at the output as noise, not distortion, which has less impact on narrow band applications. The invented system of digital circuits benefits the linearity of DACs at the expense of spectral noise density. This is an appropriate technique for DACs which are required to be highly linear over a narrow band, since the impact of higher spectral noise density on narrow band applications is of less importance.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF PRESENTLY PREFERRED EXEMPLARY EMBODIMENTS

Figure 1:
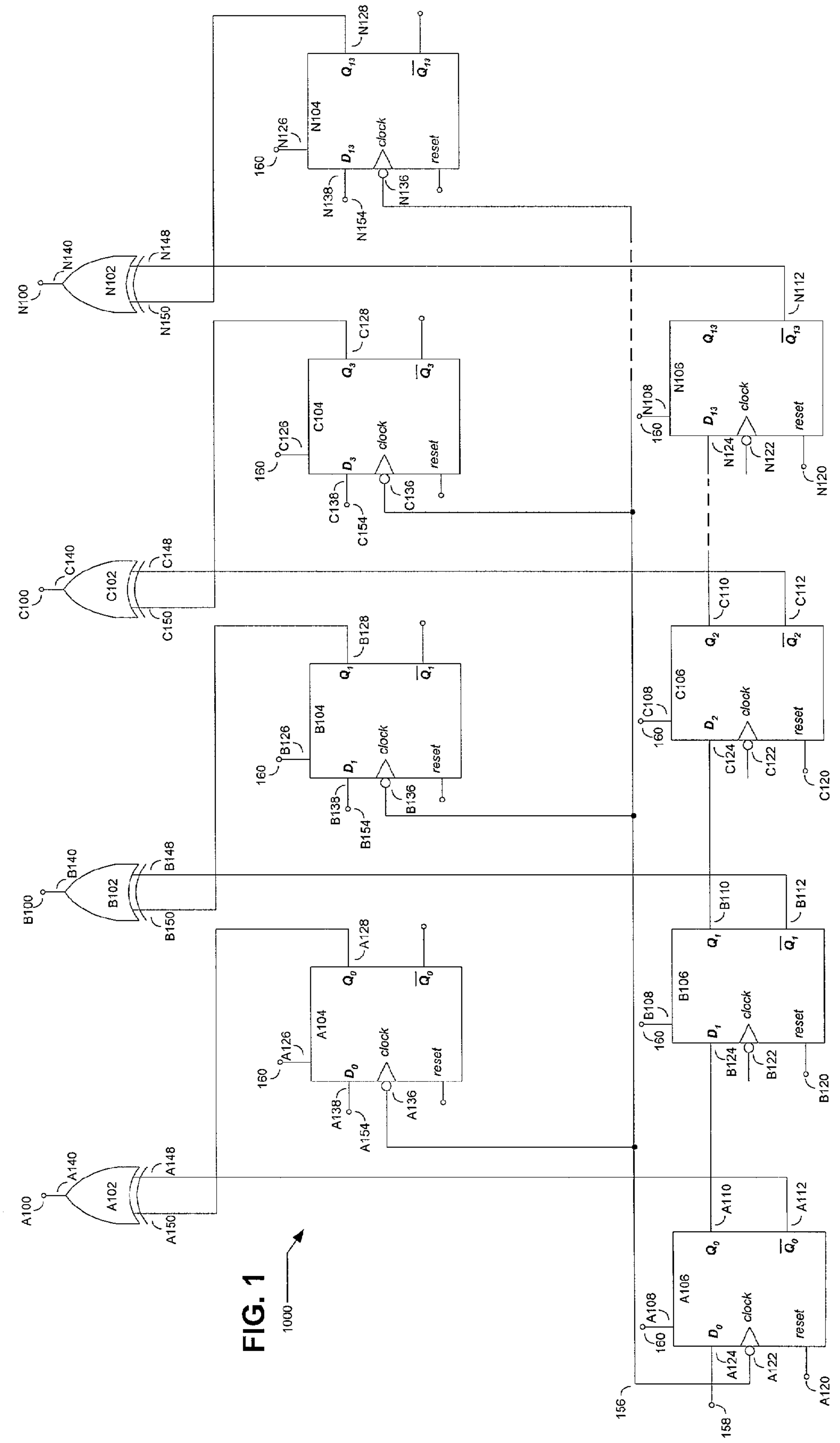
FIG. 1 illustrates an embodiment of the present invention.

The present invention provides an improved method and apparatus to suppress data-related in-band harmonics in digital to analog converters. By placing data encryption off-chip, leakage of input data harmonic content through parasitic capacitance within the IC package is minimized. Data harmonic content is reduced to output noise rather than distortion with the increased spectral noise density having less impact on DAC performance.

In FIG. 1, an illustrative circuit of one embodiment of the present invention is shown. FIG. 1, schematic 1000 illusthe first logic gate A100 corresponds to bit 0, output of the second logic gate B100 corresponds to bit 1 and so forth.

The first register A106 and the first latch A104 are electrically coupled in parallel to the first X-OR gate A102. Pin A108 (Vcc) of the first register is electrically coupled to the supply voltage at 160. Pin A110 is electrically coupled to the second register at B124. Pin A112 is electrically coupled to the first X-OR gate A102 at input A148. Pin A120 (rst) is electrically coupled to an external reset. Pin A122 is electrically coupled to the system clock bus at 156 and pin A124 (pr) is electrically coupled to a dedicated pad input at 158.

The first latch A104 as stated, is also electrically coupled to the first X-OR gate A102. Pin A126 (Vcc) is electrically coupled to the supply voltage at 160. Pin A128 is electrically coupled to the first X-OR gate A102 at input A150. Pin A136 (ck) is electrically coupled to the clock bus at 156 and pin A138 is electrically coupled to the raw data single bit input at A154.

The first X-OR gate A102 has two inputs A148 and A150, and a single output A140. Input A148 is electrically coupled to the first register A106 at A112 and input A150 is electrically coupled to the first latch A104 at A128. The output A140 of the first X-OR gate is electrically coupled to A100.

The second register B106 and the second latch B104 are electrically coupled in parallel to the second X-OR gate B102. Pin B108 (Vcc) of the second register is electrically coupled to the supply voltage at 160. Pin B110 is electrically coupled to the third register at C124. Pin B112 is electrically coupled to the second X-OR gate B102 at input B148. Pin B120 (rst) is electrically coupled to an external reset and pin B124 (pr) is electrically coupled to the first register at A110.

The second latch B104 as stated, is also electrically coupled to the second X-OR gate B102. Pin B126 (Vcc) is electrically coupled to the supply voltage at 160. Pin B128 is electrically coupled to the second X-OR gate B102 at input B150. Pin B136 (ck) is electrically coupled to the clock bus at 156 and pin B138 is electrically coupled to the raw data single bit input at B154.

The second X-OR gate B102 has two inputs B148 and B150, and a single output B140. Input B148 is electrically coupled to the second register B106 at B112 and input B150 is electrically coupled to the second latch B104 at B128. The output B140 of the second X-OR gate is electrically coupled to B100.

The third register C106 and the third latch C104 are electrically coupled in parallel to the third X-OR gate C102. Pin C108 (Vcc) of the third register is electrically coupled to the supply voltage at 160. Pin C110 is electrically coupled to the fourth register in a fashion identical to the coupling of the second register B106 to the third register C106. Pin C112 is electrically coupled to the third X-OR gate C102 at input C148. Pin C120 (rst) is electrically coupled to an external reset and pin C124 (Pr) is electrically coupled to second register at B110.

The third latch C104 as stated, is also electrically coupled to the third X-OR gate C102. Pin C126 (Vcc) is electrically coupled to the supply voltage at 160. Pin C128 is electrically coupled to the third X-OR gate C102 at input C150. Pin C136 (ck) is electrically coupled to the system clock bus at 156 and pin C138 is electrically coupled to the raw data single bit input at C154.

The third X-OR gate C102 has two inputs C148 and C150, and a single output C140. Input C148 is electrically coupled to the third register C106 at C112 and input C150 is electrically coupled to the third latch C104 at C128. The output C140 of the third X-OR gate is electrically coupled to C100.

The remaining eleven register-latch-gate combinations are similarly configured. As is well known by those skilled in the art, additional operational and control pins exist on D-Type flip flops and X-OR logic gates such as direct set and ground connections. These pins are supplied in the present invention but not shown in the drawings.

As stated, the lower row of devices A106–N106, serve as a 14-bit shift right register. The shift register serves to store, then shift binary data, either to the right or to the left, when clocked. The contents of each register, either a 1 or 0, is shifted to the right in this application, upon the rising edge of the system clock pulse. Therefore, in the present invention, fourteen system clock cycles are required to load the random bit register, which may then be used as an input to the X-OR logic gate.

The exclusive-OR logic gates (X-OR) A102–N102, each have two binary inputs and a single binary output. The output of the X-OR logic gate will only be a 1 if there is an unmatched input pair. If the inputs to an X-OR logic gate are both 1 or are both 0, the output of the logic gate will be 0. The following truth table illustrates the performance of the X-OR logic gates used in the present invention.

| Input 1 | Input 2 | Output |
|---|---|---|
| 0 | 0 | 0 |
| 0 | 1 | 1 |
| 1 | 0 | 1 |
| 1 | 1 | 0 |

In the present invention, the off-chip encrypted data (ED) is the resulting output of the fourteen X-OR logic gates when the raw data (RD), via the shift register latches, is used to provide the first input to the logic gates and the pseudo random data (PRD), in the form of a random single-bit data stream, is used to provide the second input to the logic gates via the shift right register. For each X-OR gate A102–N102, the RD provided via the latch and the PRD provided via the shift register will produce the 14-bit ED word at the gate outputs A100–N100, the single bit outputs A100–N100 corresponding to bits 0–13 of the encrypted word. To illustrate,

| (RD) A150-N150 | (PRD) A148-N148 | (ED) A100-N100 |
|---|---|---|
| 0 | 0 | 0 |
| 0 | 1 | 1 |
| 1 | 0 | 1 |
| 1 | 1 | 0 |

Identical circuitry is then used to decrypt the data once transferred onto the DAC chip. The decrypted data (DD) is the resulting output of identical X-OR logic gates when the encrypted data (ED), via identical shift register latches, is used to provide the first input to the logic gates and the pseudo random data (PRD) used for encryption, is again used to provide the second input to the logic gates via an identical shift right register.

| ED | PRD | DD |
|---|---|---|
| 0 | 0 | 0 |
| 0 | 1 | 1 |
| 1 | 0 | 1 |
| 1 | 1 | 0 |

Encryption, and in like fashion, decryption, is accomplished through the use of fourteen X-OR logic gates A102–N102. Each has a first input, which is provided by the 14-bit shift register and a second input provided by the shift register latch. The shift register is a 14-bit serial-in, parallel-out shift right register loaded with a random single-bit data stream input at A158 through a dedicated keypad. As a 14-bit shift-right register, each register will shift the binary data contained to the next register with the next clock pulse, the first register accepting and storing the data provided by the dedicated keypad. Therefore, to load the entire 14-bit register, fourteen system clock cycles are required. As shown in FIG. 1, the shift register output A110 of the first register A106 is electrically coupled to the shift register input B124 of the second register B106, the shift register output B110 of the second register is electrically coupled to the shift register input C124 of the third register C106, and so forth for all fourteen registers. The shift register input A124 of the first register A106 is electrically coupled to the dedicated keypad at A158. Upon the falling edge of the system clock pulse, the dedicated keypad is read and a right shift of the 14-bit register occurs. After fourteen clock pulses, the random bit register is loaded with a random single-bit data stream.

The second input to each of the fourteen X-OR logic gates A102–N102 is provided by the fourteen latches A104–N104. The raw data (RD) is read through a 14-bit parallel connection to the inputs A138–N138 of the fourteen latches. Shift register latches, common timing devices in memory circuits, are used to store RD values until the 14-bit shift register is loaded or to otherwise control the timing of the encryption. Once loaded, the RD from the latches A104–N104 and the PRD from the registers A106–N106 are shifted to the inputs of the electrically coupled X-OR logic gates A102–N102 on the falling edge of the system clock. The resulting output of the X-OR logic gates is a 14-bit encrypted word at A100–N100. As an example,

| bit | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Hypothetical Raw Data(RD) | 1 | 0 | 1 | 1 | 0 | 1 | 1 | 0 | 0 | 1 | 1 | 1 | 1 | 1 |
| Hypothetical Pseudo Random Data(PRD) | 0 | 1 | 0 | 1 | 0 | 1 | 1 | 1 | 0 | 0 | 0 | 1 | 1 | 1 |
| Encrypted Data (ED) = XOR (RD, PRD) | 1 | 1 | 1 | 0 | 0 | 0 | 0 | 1 | 0 | 1 | 1 | 0 | 0 | 0 |

The encrypted data and the pseudo random data are then read onto the DAC chip on the rising edge of the system clock for decryption, accomplished using identical circuitry with the same random data as used for off-chip encryption. The encrypted data (ED) is read through a 14-bit parallel connection to the inputs of fourteen shift register latches on the DAC chip and the identical random single-bit data stream (PRD) is input into the random bit register on the DAC chip. There, upon the rising edge of the system clock, the ED from the latches and the PRD from the registers is shifted to the inputs of the electrically coupled X-OR logic gates, the outputs resulting in the 14-bit raw data word on chip. Once again, as an example,

| bit | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| Encrypted Data (ED) | 1 | 1 | 1 | 0 | 0 | 0 | 0 | 1 | 0 | 1 | 1 | 0 | 0 | 0 |
| Pseudo Random Data (PRD) | 0 | 1 | 0 | 1 | 0 | 1 | 1 | 1 | 0 | 0 | 0 | 1 | 1 | 1 |
| Decrypted Data (DD) = XOR (ED, PRD) | 1 | 0 | 1 | 1 | 0 | 1 | 1 | 0 | 0 | 1 | 1 | 1 | 1 | 1 |

By encrypting the data with a random data string, the harmonic content of the input data is no longer correlated to the output data. In doing so, we eliminate the adverse effects of correlation between the digital data input and the DAC output. By encrypting the data off-chip, the harmonic content of the input data is isolated from the DAC chip eliminating leakage to the output through DAC chip package-related parasitic capacitance. As pointed out in Jewett, a raw digital signal may contain frequency components that could interfere with other signal paths.

Attempts to eliminate these adverse effects have included shielding with long, thick field insulating oxide layers as discussed in Gonzalez et al., however as IC package sizes have decreased, there is insufficient space for insulating layers. Also, the solution disclosed in Gonzalez et al. does not fully address package-related leakage of harmonic content of the input data.

Jewett, addressing crosstalk in analog-to-digital converters, disclosed a method and apparatus to encode and output signal to eliminate all correlation between the analog input signal and the encoded output signal. Coherence is prevented since the random number used for encoding is uncorrelated with the analog signal. However, Jewett does not address package related leakage, which continues to create undesired effects when all circuits are contained within a single package.

The present invention suppresses these detrimental effects through component placement and operation. The present invention eliminates DAC package-related leakage (such as through parasitic capacitance) by encrypting input data, to eliminate correlation between input and output signals, off the DAC chip, which isolates input data harmonic content from the DAC chip, preventing package related leakage. Decryption is performed via identical circuitry on the DAC chip after the encrypted data and the random number string is transferred onto the DAC chip and distortion in DAC output due to package-related leakage through parasitic capacitance is suppressed. Any harmonic content now appears as an increase in spectrum noise rather than output distortion and has less impact on narrow band linearity applications.

We claim:

1. A method of n-bit digital-to-analog converter chip parallel input data encryption and decryption wherein said encryption occurs off said DAC chip such that data-related in-band harmonics are suppressed, comprising the steps of:

a. loading an n-bit raw data word into a first array of latches located off a DAC chip, said first array of latches comprised of a plurality of D-Type flip flop devices each having a data input, a clock input, and an outputs, b. loading an n-bit pseudo random data word into a first multi-stage shift register located off said DAC chip, said first multi-stage shift register comprised of a plurality of D-Type flip flop devices each having a data input, a clock input, and first and second outputs, said plurality of D-Type flip flop devices being coupled in series by having said first output of a preceding device coupled to said data input of a following device, c. clocking said first array of latches and said first multi-stage shift register to generate outputs of said first array of latches and first and second outputs of said first multi-stage shift register;

d. transferring said outputs of said first array of latches and said second outputs of said first multi-stage shift register into a first array of exclusive-OR logic gates located off said DAC chip, said first array of exclusive-OR logic gates comprised of a plurality of exclusive-OR logic gates each having first and second inputs, and an output;

e. said first array of exclusive-OR logic gates performing an exclusive-OR logic examination of said outputs of said first array of latches and said second outputs of said first multi-stage shift register, said examination resulting in a first exclusive-OR logic gate array output, said first exclusive-OR logic gate array output being an n-bit encrypted data word;

f. loading said n-bit encrypted data word into a second array of latches located on said DAC chip, said second array of latches comprised of a plurality of D-Type flip flop devices each having a data input, a clock input, and an outputs;

g. loading said n-bit pseudo random data word into a second multi-stage shift register located on said DAC chip, said second multi-stage shift register comprised of a plurality of D-Type flip flop devices each having a data input, a clock input, and first and second outputs; wherein said plurality of D-Type flip flop devices is coupled in series by having said first output of a D-Type flip flop coupled to said data input of an adjacent D-Type flip flop, h. clocking said second array of latches and said second multi-stage shift register to generate outputs of said second array of latches and first and second outputs of said second multi-stage shift register;

i. transferring said outputs of said second array of latches and said second outputs of said second multi-stage shift register into a second array of exclusive-OR logic gates located on said DAC chip, said second array of exclusive-OR logic gates comprised of a plurality of exclusive-OR logic gates each having first and second inputs, and an output; and j. said second array of exclusive-OR logic gates performing an exclusive-OR logic examination of said first outputs of said second array of latches and said second outputs of said second multi-stage shift register, said examination resulting in a second exclusive-OR logic gate array output, said second exclusive-OR logic gate array output being said n-bit raw data word.

2. A method as recited in claim 1 further comprising isolating input data harmonic content of said n-bit raw data word off chip.

3. A method as recited in claim 2 further providing preventing leakage of said input data harmonic content into said second exclusive-OR logic gate array output via package related parasitic capacitance, said leakage prevention improving linearity of said DAC chip.

4. An electrical device suitable for use as an n-bit digital-to-analog converter chip parallel input data encryption circuit, said encryption circuit located off said converter chip such that data-related in-band harmonics are suppressed, wherein said encryption circuit is comprised of:

a. a digital to analog converter (DAC) chip;

b. a first array of latches located off said DAC chip, said first array of latches receiving, storing and transmitting an n-bit raw data word;

c. a first multi-stage shift register located off said DAC chip, said first multi-stage shift register receiving, storing and transmitting an n-bit pseudo random data word;

d. a first array of exclusive-OR logic gates located off said DAC chip, said first array of latches and said first multi-stage shift register electrically coupled to said first array of exclusive-OR logic gates;

e. a system clock located off said DAC chip, said system clock synchronizing a transfer of said n-bit raw data word from said first array of latches, and said n-bit pseudo random data word from said first multi-stage shift register, into said first array of exclusive-OR logic gates;

f. said first array of exclusive-OR logic gates located off said DAC chip performing an exclusive-OR logic examination of said n-bit raw data word and said n-bit pseudo random data word, said examination by said first array of exclusive-OR logic gates producing a first exclusive-OR logic gate array output, said first exclusive-OR logic gate array output being an n-bit encrypted data word; and g. said system clock located off said DAC chip synchronizing a transfer of said n- bit encrypted data word into said DAC chip for decryption.

5. An electrical device as recited in claim 4 wherein said first array of exclusive-OR logic gates is comprised of a plurality of exclusive-OR logic gates corresponding to n-bits of said n-bit raw data word, each said exclusive-OR logic gate having first and second inputs and an output.

6. An electrical device as recited in claim 5 wherein each said output of each said exclusive-OR logic gate corresponds to a single bit of said n-bit encrypted data word.

7. An electrical device as recited in claim 4 wherein said first array of latches is comprised of a plurality of latches corresponding to n-bits of said n-bit raw data word, each said latch having an input, a clock input and first and second outputs.

8. An electrical device as recited in claim 7 wherein each said latch is a D flip flop.

9. An electrical device as recited in claim 7 wherein each said clock input of said plurality of latches is electrically coupled to said system clock.

10. An electrical device as recited in claim 4 wherein said n-bit raw data word is loaded via parallel electrically coupled inputs into said inputs of said first array of latches, and said first outputs of said first array of latches is loaded via parallel electrically coupled inputs into said first inputs of said first array of exclusive-OR logic gates, such that each electrically coupled latch first output, exclusive-OR logic gate first input and raw data word bit corresponds to a single bit of said n-bit raw data word.

11. An electrical device as recited in claim 4 wherein said first multi-stage shift register is comprised of a plurality of stages, each said stage having an input, a clock input and first and second outputs, wherein said first output is electrically coupled to an adjacent stage and said second output is electrically coupled to said exclusive-OR logic gate.

12. An electrical device as recited in claim 11 wherein each said stage is a D flip flop configured as a shift register with an n-bit pseudo random data word serial input electrically coupled to said input of a first stage of said plurality of stages, and a remainder of said plurality of stages electrically coupled in series to said first stage in a shift register configuration, said shift register configuration comprised of electrically coupling said first output of one stage to said input of a following stage for each stage of said plurality of stages.

13. An electrical device as recited in claim 11 wherein said clock input of said first stage is electrically coupled to said system clock.

14. An electrical device as recited in claim 4 wherein said n-bit pseudo random data word is loaded via said n-bit pseudo random data word serial input into said inputs of said first multi-stage shift register, said second outputs of said first multi-stage shift register loaded via parallel electrically coupled inputs into said second inputs of said first array of exclusive-OR logic gates, such that each electrically coupled stage second output, exclusive-OR logic gate second input and pseudo random data word bit correspond to a single bit of said n-bit pseudo random data word.

15. An electrical device as recited in claim 4 wherein input data harmonic content of said n-bit raw data word is isolated off chip.

16. An electrical device as recited in claim 15 wherein said isolation of said input data harmonic content off chip prevents leakage of said input data harmonic content via DAC package related parasitic capacitance, said leakage prevention improving linearity of said DAC chip.

17. An electrical device suitable for use as an n-bit digital-to-analog converter chip parallel input data decryption circuit, said decryption circuit located on said converter chip wherein said decryption circuit is comprised of:

a. a digital to analog converter (DAC) chip;

b. a second array of latches located on said DAC chip, said second array of latches receiving, storing and transmitting an n-bit encrypted data word;

c. a second multi-stage shift register located on said DAC chip, said second multi-stage shift register receiving, storing and transmitting an n-bit pseudo random data word;

d. a second array of exclusive-OR logic gates located on said DAC chip, said second array of latches and said second multi-stage shift register electrically coupled to said second array of exclusive-OR logic gates;

e. a system clock located on said DAC chip, said system clock synchronizing a transfer of said n-bit encrypted data word from said second array of latches, and said n-bit pseudo random data word from said second multi-stage shift register, into said second array of exclusive-OR logic gates; and f. said second array of exclusive-OR logic gates located on said DAC chip performing an exclusive-OR logic examination of said n-bit encrypted data word and said n-bit pseudo random data word, said examination by said second array of exclusive-OR logic gates producing a second exclusive-OR logic gate array output, said second exclusive-OR logic gate array output being an n-bit raw data word.

18. An electrical device as recited in claim 17 wherein each latch in said second array of latches is a D flip flop.

19. An electrical device as recited in claim 17 wherein said second array of latches is electrically coupled to said second array of exclusive-OR logic gates.

20. An electrical device as recited in claim 17 wherein a first n-bit data word is loaded into said second array of latches, said first n-bit data word comprised of said n-bit encrypted data word.

21. An electrical device as recited in claim 17 wherein each stage is a D flip flop.

22. An electrical device as recited in claim 17 wherein said second multi-stage shift register is electrically coupled to said second array of exclusive-OR logic gates.

23. An electrical device as recited in claim 17 wherein a second n-bit data word is loaded into said second multi-stage shift register as, said second data word comprised of said n-bit pseudo random data word.

24. An electrical device as recited in claim 17 wherein said second array of exclusive-OR logic gates is comprised of a plurality of exclusive-OR logic gates corresponding to n-bits of said n-bit raw data word, each said exclusive-OR logic gate having first and second inputs and an output.

25. An electrical device as recited in claim 17 wherein said exclusive-OR logic examination produces a third n-bit data word, said third n-bit data word comprised of said n-bit raw data word.

26. An electrical device as recited in claim 17 wherein said n-bit encrypted data word is isolated from input data harmonic content of said n-bit raw data word off chip.

27. An electrical device as recited in claim 26 wherein said isolation of said input data harmonic content off chip prevents leakage of said input data harmonic content into said second exclusive-OR logic gate array output via package related parasitic capacitance, said leakage prevention improving linearity of said DAC chip.

* * * * *